United States Patent [19]

Liebermann et al.

[11] Patent Number: 4,771,133

[45] Date of Patent: Sep. 13, 1988

[54] PHTHALOCYANINE TREATMENT PROCESS

[75] Inventors: George Liebermann; Ah-Mee Hor; Alan E. J. Toth, all of Mississauga, Canada

[73] Assignee: Xerox Corporation, Stamford, Conn.

[21] Appl. No.: 19,109

[22] Filed: Feb. 26, 1987

[51] Int. Cl.$^4$ .......................................... C09B 47/067
[52] U.S. Cl. ................................. 540/143; 540/140; 540/141
[58] Field of Search ....................... 540/140, 143, 141

[56] References Cited

U.S. PATENT DOCUMENTS

| | | | |
|---|---|---|---|
| 2,155,038 | 4/1939 | Davies et al. | 260/314 |
| 3,717,493 | 2/1973 | Griswold | 106/288 |
| 3,825,422 | 7/1974 | Gruber et al. | 96/1 |
| 4,032,339 | 6/1977 | Grushkin et al. | 96/1.5 |
| 4,076,527 | 2/1978 | Nealy | 96/1 |
| 4,459,233 | 7/1984 | Fabian et al. | 260/245.86 |
| 4,508,650 | 4/1985 | Tokoli et al. | 260/245.86 |
| 4,557,868 | 12/1985 | Page et al. | 260/245.89 |

FOREIGN PATENT DOCUMENTS 49-43264 11/1974 Japan .
502623 3/1939 United Kingdom .

OTHER PUBLICATIONS

Ziolo et al., Crystal Structure of Vanadyl Phthalocyanine, Phase II, J. C. S., Dalton, 2300–2302, 1980.

*Primary Examiner*—Richard L. Raymond
*Attorney, Agent, or Firm*—Peter H. Kondo

[57] ABSTRACT

A process is described for preparing vanadyl phthalocyanine for electrophotographic devices comprising reacting vanadium pentoxide and phthalonitile to form vanadyl phthalocyanine pigment and other reaction products, separating crude vanadyl phthalocyanine pigment from the other reaction products, washing the crude vanadyl phthalocyanine pigment, drying the crude vanadyl phthalocyanine pigment, mixing the crude vanadyl phthalocyanine pigment with a solution of between about 60 percent and about 80 percent by weight of $H_2SO_4$ to form a $H_2SO_4$-vanadyl phthalocyanine pigment mixture, diluting the $H_2SO_4$-vanadyl phthalocyanine pigment mixture with deionized water to form a diluted mixture, separating the vanadyl phthalocyanine pigment, washing the isolated vanadyl phthalocyanine pigment particles, drying the vanadyl phthalocyanine particles to form the dried, partially purified vanadyl phthalocyanine pigment, dissolving the dried, partially purified vanadyl phthalocyanine pigment in concentrated $H_2SO_4$ to form a solution of vanadyl phthalocyanine in concentrated $H_2SO_4$, adding the solution of vanadyl phthalocyanine in concentrated $H_2SO_4$ to water to precipitate the vanadyl phthalocyanine as vanadyl phthalocyanine pigment particles, separating the precipitated vanadyl phthalocyanine pigment particles from the $H_2SO_4$ and water, washing the isolated vanadyl phthalocyanine pigment particles, and drying the vanadyl phthalocyanine pigment particles to form purified vanadyl phthalocyanine pigment.

12 Claims, No Drawings

PHTHALOCYANINE TREATMENT PROCESS

BACKGROUND OF THE INVENTION

This invention relates to an improved process for preparing a vanadyl phthalocyanine composition. More specifically, this invention is directed to the synthesis and treatment of vanadyl phthalocyanine to achieve a material with superior electrophotographic properties.

Phthalocyanines in general and vanadyl phthalocyanine in particular have been described in the prior art as useful materials in electrophotographic devices. The use of phthalocyanines as photogenerator material in simple or complex electrophotographic devices is of particular interest as their photosensitivity extends from the visible region to the infrared, thus rendering them suitable for use both in conventional electrophotographic copiers and duplicators, as well as in infrared diode laser and light emitting diode (L.E.D.) based printers.

The usefulness of a photogenerator pigment such as vanadyl phthalocyanine is greatly enhanced if the pigment composition possesses a superior set of electrophotographic properties. Various characteristics of copiers, duplicators or printers, such as hardware complexity, cost, operating speed, copy or print quality, photoreceptor life, and the like, can all be impacted by the quality of the photogenerator material. It is well known to those skilled in the art that materials which seem to be identical, when examined and compared using the most elaborate physical or chemical analytical procedures, can quite often exhibit markedly different electrophotographic properties.

The preparation of vanadyl phthalocyanine is described in the open and patent literature both in terms of synthetic alternatives or typical sulfuric acid treatments used in the dye and pigment industry. Preparation methods for vanadyl phthalocyanine specifically for electrophotographic use are disclosed in U.S. Pat. No. 4,508,650 and U.S. Pat. No. 4,557,868.

PRIOR ART STATEMENT

U.S. Pat. No. 4,557,868 to Page et al issued Dec. 10, 1985. A process is described for preparing vanadyl phthalocyanine with high electrophotographic sensitivity, low dark decay and low residual charges in photoreceptors. The procedure involves three phases: (I) The synthesis of "crude" pigment from vanadium pentoxide and phthalonitrile followed by postreaction purification washings, (II) An initial purification (permutoid swelling) phase based on a treatment of the crude pigment with 60-80 percent $H_2SO_4$, a recovery of the pigment by filtration followed by purification washings, and (III) A final purification (acid pasting) phase based on the dissolution of the prepurified pigment in concentrated sulfuric acid and reprecipitation in water followed by washing of the pigment with an aqueous weak base and water.

U.S. Pat. No. 4,508,650 issued to Tokoli et al on Apr. 2, 1985—A process is disclosed for the preparation of high purity pigments, such as vanadyl phthalocyanine, comprising reacting in the presence of an organic solvent an impure pigment with an organic acid having the formula R—X, then adding an organic solvent, subsequently adding a precipitating agent, and separating the desired pure pigment from the reaction mixture, wherein R is an alkyl group containing about 4-22 carbon atoms or an aryl group containing about 6-24 carbon atoms and X is a group capable of yielding anions.

U.S. Pat. No. 2,155,038 issued to Davies et al on Apr. 18, 1939—A process is disclosed for preparing vanadyl phthalocyanine by reacting phthalonitrile and vanadium pentoxide. The resulting mixture is cooled, extracted with hot ethyl alcohol and is crystalline blue powder is obtained. The powder is treated with concentrated sulphuric acid to form an orange brown solution. The solution is diluted with water to precipitate the compound.

U.S. Pat. No. 3,717,493 issued to Griswold on Feb. 20, 1973—A process is disclosed comprising dissolving crude metal phthalocyanine in concentrated sulfuric acid of at least 96 percent by weight $H_2SO_4$; rapidly diluting the resulting solution with water or dilute sulphuric acid to provide a liquid phase acid concentration of about 64-82 percent by weight and a temperature of about 86° C.-140° C. until a crystal growth of 0.01-0.2 micrometer is achieved; rapidly diluting the resulting slurry with water to a liquid phase acid concentration below about 40 percent by weight; subjecting the slurry to conditioning to complete crystal growth; and recovering the phthalocyanine pigment from the diluted slurry.

U.S. Pat. No. 3,825,422 issued to Gruber et al on July 23, 1974—Various processes are disclosed for preparing and washing vanadyl phthalocyanine in Examples I, III, IV, V and VI, including for example, washing and forming slurries of crude vanadyl phthalocyanine with various materials, dissolving vanadyl phthalocyanine in concentrated sulfuric acid, filtering, spraying into water, filtering again, washing with water including washing with water containing concentrated ammonium hydroxide (see Example I) and preparing vanadyl phthalocyanine from a mixture of phthalonitrile and $V_2O_5$ in the absence of a solvent, cooling and forming a slurry in benzene, acetone, isopropanol, 10 percent NaOH, 10 percent HCL, then water and drying (see Example VI).

U.S. Pat. No. 4,032,339 issued to Grushkin et al on June 28, 1977—A process is disclosed comprising synthesizing vanadyl phthalocyanine, washing with various materials such as ethanol, 10 percent sodium hydroxide, 20 percent hydrochloric acid, and deionized water. The resulting material is dissolved in concentrated sulfuric acid, filtered and sprayed into water. Crystals are recovered and dispersed in water, filtered and treated to five slurry water washes, the the third and fourth containing concentrated ammonium hydroxide (see Example I).

U.S. Pat. No. 4,076,527 issued to Nealy on Feb. 28, 1978—A process is disclosed for treating vanadyl phthalocyanine pigment, including refining by "acid pasting" in concentrated sulfuric acid or other appropriate acid medium. The unrefined vanadyl phthalocyanine pigment is dissolved in the acidic medium and agitated. The temperature of the acid pasting medium is not allowed to rise above a level which could result in the decomposition of the pigment. The pigment may be contacted with a desensitizing dye. Subsequent to acid pasting, the pigment is separated from the acidic solution by quenching in water or pouring over ice. Materials not dissolved during the acid pasting procedure are separated from the acidic solution by filtration prior to quenching with water. Detailed steps are described, for example, in Example I U.S. Pat. No. 4,459,233 issued to Fabian et al.—A process for purifying crude organic pigments is disclosed comprising suspending a pigment in a mixture of two organic liquids which are partially or completely immiscible with one another, the suspension being mixed at 50° C.-189° C. until equilibrium has been reached, allowing the phase to separate, separating the phase containing the impurities and isolating the purified pigment from the other phase.

Japanese Patent Publication No. 49-43264—A process is disclosed comprising kneading crude copper phthalocyanine with 98 percent $H_2SO_4$ to form a green powder, adding $Na_2CO_3$, neutralizing with 90 percent acetic acid, and extracting with water.

U.K. Patent Publication No. 502,623 to Montecatini, published Mar. 22, 1939—A process is disclosed comprising treating phthalocyanines with sulphuric acid, the concentration of which is not more than 90 percent, to form a sulphuric acid addition compound which is hydrolyzed by the action of water. The mass obtained, or the acid paste separated by filtration and if desired washed with an acid of the same concentration, is hydrolyzed by pouring same into water and ice.

Ziolo et al., Crystal Structure of Vanadyl Phthalocyanine, Phase II, J.C.S., Dalton, 2300-2302, 1980—Vanadyl phthalocyanine is described as a photoconductor useful for photoelectrophoretic and xerographic imaging.

As the art of electrophotography continues to advance, more stringent standards need to be met by the electrophotographic imaging devices to improve performance and to obtain higher quality images. Also desirable are layered photoresponsive devices which are more responsive to visible light and/or infrared illumination for laser printing applications. As these electrophotographic products become more sophisticated and operate at higher speeds, the operating tolerances become extremely narrow and the predictability of the electrical behavior of components can be particularly critical.

While prior art processes for preparing vanadyl phthalocyanine may be suitable for their intended purposes, there continues to be a need for an improved process for preparing vanadyl phthalocyanine having improved electrical properties.

OBJECTS OF THE INVENTION

It is, therefore, an object of the present invention to provide an improved process for preparing vanadyl phthalocyanine.

Another object of this invention proposal is to provide a large scale, improved process for preparing a superior electrophotographic grade vanadylphthalocyanine.

Still another object of this invention is to provide a process which can be practiced on a large scale, e.g 100 gallon scale, to produce consistently higher quality photogenerator grade vanadyl phthalocyanine.

Another object of the present invention proposal is to provide a process which produces vanadyl phthalocyanine exhibiting significantly lower dark decay in photoreceptors than previously available materials, while exhibiting the same or better photosensitivity.

SUMMARY OF THE INVENTION

The above and other objectives are achieved by providing a process for preparing vanadyl phthalocyanine for electrophotographic devices comprising:

(a) crude vanadyl phthalocyanine pigment synthesis phase comprising reacting vanadium pentoxide and phthalonitrile to form vanadyl phthalocyanine pigment and other reaction products, separating crude vanadyl phthalocyanine pigment from the other reaction products, and drying the crude vanadyl phthalocyanine pigment;

(b) a dried, partially purified vanadly phthalocyanine pigment preparation phase comprising mixing the crude vanadyl phthalocyanine pigment with a solution of between about 60 percent and about 80 percent by weight of $H_2SO_4$ to form a $H_2SO_4$-vanadyl phthalocyanine pigment mixture, diluting the $H_2SO_4$-vanadyl phthalocyanine pigment mixture with deionized water to form a diluted mixture, separating the vanadyl phthalocyanine pigment, washing the isolated vanadyl phthalocyanine pigment particles, and drying the vanadyl phthalocyanine particles to form the dried, partially purified vanadyl phthalocyanine pigment; and (c) a purified vanadyl phthalocyanine pigment preparation phase comprising dissolving the dried, partially purified vanadyl phthalocyanine pigment in concentrated $H_2SO_4$ to form a solution of vanadyl phthalocyanine in concentrated $H_2SO_4$, adding the solution of vanadyl phthalocyanine in concentrated $H_2SO_4$ to water to precipitate the vanadyl phthalocyanine as vanadyl phthalocyanine pigment particles, separating the precipitated vanadyl phthalocyanine pigment particles from the $H_2SO_4$ and water, washing the isolated vanadyl phthalocyanine pigment particles, and drying the vanadyl phthalocyanine pigment particles to form purified vanadyl phthalocyanine pigment.

Preferably, in the dried, partially purified vanadyl phthalocyanine pigment preparation phase, diluting of the $H_2SO_4$-vanadyl phthalocyanine pigment mixture is accomplished with deionized water to achieve a dilution of between about 30 percent and about 45 percent by weight aqueous $H_2SO_4$ based on the total weight of the diluted $H_2SO_4$-vanadyl phthalocyanine pigment mixture while maintaining the dilution temperature between about −20° C. and about +5° C. Also preferred, in the purified vanadyl phthalocyanine pigment preparation phase, is the adding of the solution of vanadyl phthalocyanine in the concentrated $H_2SO_4$ to deionized water to precipitate the vanadyl phthalocyanine as vanadyl phthalocyanine pigment particles while maintaining the acid-pigment mixture at a temperature of between about 0° C. and about +5° C.

Although the improved process of this invention is divided into three phases to facilitate description, the phases are interrelated and individually and cooperatively contribute to the important improved electrical characteristics of the final pigment product.

The first phase, Phase I, involves a crude vanadyl phthalocyanine pigment synthesis phase.

The starting reactants of the process of this invention comprise vanadium pentoxide, phthalonitrile, and ethylene glycol. The mole ratio of phthalonitrile to vanadium pentoxide in the reaction mixture is preferably between about 10:1 and about 14:1. A larger excess of phthalonitrile leads to sacrificial loss of phthalonitrile and in more side product impurities which must be removed in subsequent process steps. As the above molar ratio is decreased, yields decrease based on equivalents of vanadium pentoxide charged.

Any suitable alcohol having two or more hydroxyl groups may be employed. Typical polyfunctional alcohols include ethylene glycol, propylene glycol, butylene glycol, glycerol and any other mono or polyols. Optimum yields are achieved with ethylene glycol which is inexpensive and available in bulk. Preferably, sufficient alcohol should be present to achieve refluxing of the reaction mixture to prevent unduly high reaction mixture temperatures after the exotherm temperature is reached. Unduly high reaction mixture temperatures promote greater side reactions which, in turn, promote the formation of undesirable impurities.

Sufficient heat should be supplied to the reaction mixture in order to induce the exotherm. The exotherm is observed in the process when the reactor temperature exceeds the jacket temperature in the heat up period.

It is important that the reaction mixture be agitated during the reaction. Vigorous agitation is preferred. Agitation may be accomplished by any suitable means such as propeller, turbine, or anchor mixers, and the like. To promote turbulence in the reaction mixture, the reaction vessel may contain baffles, and the like. A typical mixing arrangement comprises a 100 gallon Pfaudler glass lined reactor with "H" shaped baffles and a three-blade retreat curve impeller agitator rotated at about 100 rpm by a 3 horsepower motor.

The reaction may be conducted under reduced pressure, atmospheric pressure, or super atmospheric pressure. Generally, reactions at atmospheric pressure are preferred to avoid the necessity of special pressurized equipment and to minimize energy consumption for conducting the reaction.

Generally, the reaction mixture is preferably heated as rapidly as practical to the exotherm temperature region to minimize the occurrence of side reactions. The temperature of the heating medium in the jacket is allowed to level off at about or slightly prior to the point in time when the reaction mixture attains the exotherm temperature. The temperature of the reaction mixture continues to rise beyond the temperature of the jacket due to the heat generated in the reaction mixture during the exothermic reaction. The next segment of the reaction is a particularly critical period in which the temperature of the reaction mixture must be raised above the exotherm onset temperature and must be maintained at the exotherm temperature until substantial completion of the reaction or until the exotherm abates (batch temperature begins to decrease). After substantial completion of the reaction, the application of heat to the reaction mixture may be discontinued. Although a steam jacket was employed to heat the reaction mixture, any other suitable conventional heating may be employed. Typical heating means include heated oil jackets, electric mantels, heat transfer fluid circulating systems, and the like. Cooling may be effected merely by terminating the addition of heat to the reaction vessel. If desired, cooling may be accelerated by any suitable conventional means.

After completion of the reaction, the reaction mixture is filtered to obtain a pigment cake. Filtering may be accomplished by any suitable conventional means such as vacuum or pressure filtration. Stainless steel, ceramic, glass lined or plastic filters and the like of different construction can be used. After filtering to form a first pigment cake, the pigment cake is washed with a dipolar aprotic solvent. Washing can be accomplished on the filter, with or without reslurrying the cake. Any suitable dipolar aprotic solvent may be utilized. Typical dipolar aprotic solvents include dimethyl sulfoxide, N,N-dimethyl acetamide, N-methyl-2-pyrrolidone, sulfolane, N,N-dimethyl formamide, and the like. Generally, it is preferred that the dipolar aprotic solvent be warmed to enhance removal of impurities in the reaction mixture and to minimize the time for removing impurities. A solvent temperature of between about 50° C. about 90° C. is preferred for rapid removal of impurities. N,N-dimethyl formamide is a preferred dipolar aprotic solvent. The washing step is carried out at least once but may, if desired, be repeated. Moreover, the pigment cake may be additionally washed with a suitable solvent such as an alcohol. Typical alcohols include ethanol, isopropanol, butanol, and the like. This washing step enhances the removal of any pigment imbibed dipolar aprotic solvent which is miscible with the alcohol.

The washed filter cake may optionally be treated with any suitable strong base. Typical strong bases include sodium hydroxide, potassium hydroxide, and the like. The base is generally employed as a dilute solution. A dilute solution of between about 3 percent by weight and about 6 percent by weight is preferred. Treatment with a strong base aids in the removal of any vanadium pentoxide or other species remaining in the filter cake. Treatment with a strong base is typically accomplished by forming a slurry with mechanical agitation to form a uniform slurry. A typical strong base treatment may be carried out at between about 50° C. and about 80° C. for about 1 hour. If this optional treatment with a base is employed, the resulting slurry is filtered by any suitable means such as a conventional vacuum filtration system and thereafter washed with prewarmed deionized water. For reasons of economy and impurity solubilities, the slurry should be vacuum filtered while the slurry is still hot from the treatment with the base. If an agitated filter is employed, reslurry washings can be performed in the filter. Washing of the filtered pigment cake may be repeated as desired. However, the treatment with the base as well as the subsequent filtering, or washing on the filter with the base, and the subsequent washing steps are merely optional and may be omitted if desired.

The pigment cake resulting from the preceding steps is dried to remove any of the solvents which were utilized to wash the crude pigment. Drying may be carried out by any suitable conventional means such as convection air ovens, vacuum ovens, and the like. A typical drying technique (after strong base slurry and water washes) involves placing the moist pigment cake in oven trays in a vacuum oven at between about 65° C. and about 90° C. until a constant weight is achieved.

The crude dried pigment is preferably protected from direct exposure to light during the following processing steps of the second treatment phase of this invention. The second phase, Phase II, of this invention involves initial purification steps including permutoid swelling. Permutoid swelling is the leaching out of chemical impurities from an acid swollen mass representing a protonated form of vanadyl phthalocyanine.

The dried, crude pigment is treated in a jacketed reactor with a strong acid. Any suitable strong organic or inorganic acid capable of swelling vanadyl phthalocyanine pigment and dissolving the impurities therein may be employed. Typical strong acids include sulfuric acid, phosphoric acid, methane sulfonic acid, and the like. The concentration of the strong acid should be between about 60 percent by weight and about 80 percent by weight. Concentrations of a strong acid below about 60 percent by weight are less effective in removing sufficient impurities from the crude pigment. Acid concentrations greater than about 80 percent by weight lead to lower yields. Sulfuric acid is the preferred strong acid. Some of the impurities dissolved by the acid include phthalimide, phthalic acid, phthalamic acid, and phthaldiamide. The crude dried pigment should be added slowly and incrementally with sufficient agitation and cooling to maintain the pigment-acid mixture at between about −20° C. to about +25° C. The pigment is added slowly to assist in maintaining the mixture at less than about 30° C. and more preferably at less than about 25° C. to avoid an excessive increase in temperature to levels which may cause minor pigment degradation, presumably through hydrolytic pathways. Optimum results are achieved when the pigment-acid mixture is maintained at between about 0° C. and about 25° C. The acid mixture is agitated so that all the pigment particles are in a swollen state throughout the addition time period and for 3 hours thereafter. This ensures total solvent contact and swelling, thereby improving the efficiency of the leaching process. The pigment may be left in the acid slurry for up to about 20 hours. The pigment-acid mixture in the reactor is thereafter cooled to about −20° C. to about +5° C. by circulating refrigerant in the reactor jacket. The acid slurry in the reactor is thereafter diluted with deionized water. The expression "deionized water" as employed herein is intended to include water which is free of ions such as water treated with an ion exchanger, distilled water and the like. During dilution with deionized water, the water addition rate, the degree of acid slurry agitation and application of external cooling to the reactor jacket are adjusted to maintain the slurry temperature below about room temperature, and more preferably, between about −20° C. and about +5° C. This temperature range for the deionized water dilution step is very important for obtaining lower dark decay pigments, with practically the same or slightly better photosensitivities. A temperature range of between about −5° C. and about +4° C. is preferred to achieve optimum reduction of dark decay for the pigments, with practically the same or slightly better photosensitivities. Generally, sufficient deionized water is added to achieve a dilution to between about 20 percent and about 50 percent by weight aqueous sulfuric acid to achieve a preferred viscosity volume ratio for improved overall filtration time during the subsequent filtration step. Optimum filtration times are achieved with a dilution to between about 30 percent and about 45 percent by weight aqueous sulfuric acid. Some of the diluted acid slurry is then transferred to a large capacity filter equipped with a cooling jacket. Typical large capacity filters include Teflon coated stainless steel, plastic, glass lined, agitated, jacketed or not, vacuum or pressure filters, and the like having capacities of, for example, 50–100 gallons. After transfer of some of the diluted acid slurry to the filter is completed, vacuum filtration is initiated. The filtration is carried out under continuous agitation. Agitation may be effected by any suitable means. Typical agitation devices include, propellers, pitched blade turbine, paddles, and the like. As the vacuum filtration is continued, the remaining material from the reactor is transferred to the filter as space becomes available. For large filters, the entire contents of the reactor may be transferred to the filter after dilution with deionized water. If desired, and if the filter has sufficient capacity, dilution may be effected in the filter rather than or in addition to the reactor. When the deionized water dilution treatment was omitted for a large batch size of, for example 100 gallons, filtration of the acid slurry was very slow and extended over so many days that the filtration had to be stopped and the filter contents discharged. Employment of the dilution with deionized water step markedly reduces filtration time to less than one day, e.g. 15 hours for a 300 liter acid slurry batch. In other words, without the water dilution treatment, filtration of large batch sizes of 75 percent $H_2SO_4$-vanadyl phthalocyanine cannot be performed at this scale within reasonable equipment and time conditions. Thus, the procedure practiced according to U.S. Pat. No. 4,557,868 encounters major equipment and time condition difficulties in the scale-up of the filtration step in the prepurification (permutoid swelling phase).

Following the separation of the vanadyl phthalocyanine cake from the diluted acid slurry by filtration, the wet cake is extensively washed with various liquids. Large quantities of liquids and extended contact times are employed. For reasons of economy, the washing is preferably conducted while the pigment cake remains in the filter. If desired, a slurry may be formed with the washing medium followed by filtering. The first washing of the pigment cake is carried out with cold deionized water preferably at a temperature of between about 10° C. and about 25° C. This step may be repeated one or more times, if desired. Cold deionized water is preferred in order to avoid any decomposition of the pigment while still in an acidic media.

The pigment cake is then washed with a dilute aqueous base to remove the residual acid. Any suitable dilute aqueous base may be employed. Typical aqueous bases include sodium hydroxide, ammonium hydroxide, potassium hydroxide, and the like. For example, a 4 percent by weight solution of sodium hydroxide and water may be employed. The dilute aqueous base is heated to between about 70° C. and about 80° C. to facilitate removal of residual acid. Considerable latitude has been observed in regard to the degree of agitation, heating, and time of contact between the base and the pigment. This step may be repeated one or more times, if desired.

The pigment cake is next washed with warmed deionized water preferably at a temperature of between about 70° C. and about 80° C.

The pigment cake is thereafter washed with a dipolar aprotic solvent to remove the impurities that were not removed during the other washing steps. The dipolar aprotic solvent is preferably heated to a temperature between about 70° C. and a temperature below the boiling point of the dipolar aprotic solvent. Agitation may be applied during contact between the pigment particles and the dipolar solvent. This step may be repeated one or more times, if desired. The pigment cake is next washed with warmed deionized water preferably at a temperature of between about 70° C. and about 80° C. Other more expensive solvents such as alcohols or alcohol-water mixtures at room temperature may be substituted for the prewarmed deionized water. This step may be repeated one or more times, if desired. These washing steps with the dipolar aprotic solvent or with the warmed deionized water may be repeated one or more times or omitted altogether.

The pigment cake is thereafter dried. A low water content is important to prevent excessive dilution of the acid in the subsequent step. Typically, the pigment can be adequately dried by placing the pigment in a vacuum shelf drier maintained, for example, at between about 80° C. and about 90° C. under vacuum until constant weight is achieved. The pigment clumps in the trays after partial drying may be lightly pulverized for more rapid drying and more rapid dissolving of the resulting prepurified vanadyl phthalocyanine in the subsequent acid purification step.

The final phase, Phase III, of the process of this invention involves final purification steps including acid pasting. Acid pasting requires the dissolution of the pigment in a strong acid such as sulfuric acid having a concentration of greater than or equal to about 94 percent by weight and precipitation of the resulting pigment solution to remove impurities and to reduce pigment particle size. Highly controlled conditions are required for solution and precipitate formation.

More specifically, the dried, pulverized, prepurified vanadyl phthalocyanine pigment is mixed with a chilled strong acid. Any suitable strong organic or inorganic acid capable of completely dissolving vanadyl phthalocyanine pigment and dissolving the impurities therein may be employed. Typical strong acids include sulfuric acid, phosphoric acid, methane sulfonic acid, and the like. Sulfuric acid is the preferred strong acid. The concentration of the strong acid is preferably at least about 94 percent by weight. Concentrations of a strong acid at or below about 93 percent by weight caused photoreceptors in which the acid treated vanadyl phthalocyanine pigment were used to exhibit unacceptably high dark decay. The temperature of the acid is preferably maintained at a temperature below about 12° C. although brief temperature spikes as high as, for example, 22° C. can be tolerated. However, sustained temperatures at about room temperature (about 22° C.) caused photoreceptors in which the acid treated vanadyl phthalocyanine pigment were used to exhibit unacceptably high dark decay due, apparently to impurities that were formed and retained from the sustained elevated temperature treatment. Optimum results are achieved when the temperature of the acid is maintained at a temperature between about +5° C. and about +10° C. The quantity of impurities formed in the solution increases with temperature and residence time. The pulverized crude dried pigment should be added slowly and incrementally with agitation of the acid at a temperature below about +12° C. in a suitable reactor equipped with a suitable cooling means such as a jacket. The pigment is added slowly to avoid an excessive increase in temperature exceeding about +12° C. for any sustained time period. The acid mixture is vigorously agitated to maintain a more uniform solution temperature and to promote more rapid dissolving of the pigment in the acid. The pigment may be left in the acid solution for between about 2 hours and about 6 hours. Residence times exceeding about 6 hours tends to cause the formation of unacceptably large amounts of impurities. Less than about 2 hours may be feasible depending upon the amount of acid employed relative to the quantity of pigment and the rate of dissolution.

The pigment-acid solution should next be added slowly and incrementally with agitation and cooling into deionized water precooled to a temperature of between about 0° C. to +5° C. If desired, minor amounts of a suitable water miscible acid nonreactive solvent such as alcohols may be added to the water bath. The pigment-acid solution is added slowly to avoid any significant increase in bath temperature exceeding the range of about between about 0° C. to +5° C. for any sustained time period and to ensure that a small pigment particle size and minimal impurities are formed. Excessively high bath temperatures cause unduly rapid hydrolytic breakdown of the pigment, agglomeration of the pigment particles formed and trapping of impurities in the pigment agglomerates.

The acid treated pigment may be introduced into the water in the form of one or more streams to promote more rapid dissipation of heat. The introduction should not be so slow as to unduly extend the pigment residence time in the strong acid thereby allowing high levels of impurities to form prior to quenching in the cold water. A typical introduction time is about 1.75-2 hours. Preferably the acid-pigment solution is introduced at a rate sufficient to form particles having an average particle size less than about 0.1 micrometer at a bath temperature maintained at between about 0° C. to +5° C. The water must be vigorously agitated to maintain a uniform temperature and to promote more rapid dispersing of the pigment in the aqueous system. Any suitable conventional agitation means, such as those previously described above, capable of vigorously agitating the bath may be employed. To promote turbulence in the reaction mixture, the reaction vessel may contain baffles, and the like. A refrigerant is circulated in the reactor jacket to ensure that the bath is maintained at a temperature between about 0° C. to +5° C. for any sustained time period. If desired, other suitable cooling means such as refrigerated cooling coils submerged in the bath may be substituted for or employed in conjunction with the jacket. The pigment slurry is then transferred to a large capacity filter. Typical large capacity filters include Teflon coated stainless steel filters, plastic filters, ceramic filters, and the like having capacities of, for example, 50-100 gallons. After transfer of some of the pigment to the filter is completed, vacuum filtration is initiated. As the vacuum filtration is continued, the remaining material from the reactor is transferred to the filter as space becomes available. For large filters, the entire contents of the reactor may be transferred to the filter. The resulting filter cake is washed, with continuous agitation in the filter, with deionized water at about room temperature. This reslurry washing step with the room temperature deionized water is repeated one or more times. The washing filtration process was continued using deionized water preheated to between about 70° C.-85° C. Contact time of from about 15 and about 60 minutes may be utilized prior to applying the vacuum in order to drain the wash. This washing step is carried out with the use of warmed deionized water free of ammonium hydroxide as it was found that the use of a base like ammonium hydroxide could adversely affect the photosensitivity of the pigment.

The conductivity of the effluent wash is monitored during the washing steps. The washings conducted with prewarmed deionized water are considered completed when the conductivity of the effluent is consistently under about 10 micromhos. If the conductivity of the effluent is greater than about 10 micromhos, the final photoreceptor has been found to exhibit unacceptable levels of dark decay. Final solvent washings, like methanol, ethanol and the like can be optionally used. After the final washing-filtration the wet cake is dried until constant weight is observed. Any suitable drying technique may be employed. For example drying may be effected in a vacuum shelf dryer maintained at about 80° C.-90° C. under vacuum until constant weight for the purified vanadyl phthalocyanine pigment is achieved.

The above described three phase procedure of this invention is similar to the three phase procedure described in U.S. Pat. No. 4,557,868 to Page et al, the entire disclosure of this patent being incorporated herein by reference. Thus, the procedure which is described in U.S. Pat. No. 4,557,868 involves three steps (I) The synthesis of "crude" pigment followed by post-reaction purification washings, (II) A prepurification (permutoid swelling) step, and (III) A final purification acid pasting step. However, the process of this invention involves a number of specific process modifications of the procedure described in U.S. Pat. No. 4,557,868, the modifications having a significant effect on the electrophotographic properties of the final pigment. For example, the Page et al process produces photoreceptor grade vanadyl phthalocyanine at relatively small scales such as at a laboratory scale and at about the 10 gal. scale whereas the present invention relates to a process for preparing vanadyl phthalocyanine for photoreceptor at very large scales, such as at the 100 gal. scale. Several modifications to the above mentioned procedure described in U.S. Pat. No. 4,557,868 have been incorporated in the process of this invention in order to render the process feasible at large scale, concomitantly producing a pigment with significantly improved xerographic properties. More specifically, in the initial purification step (permutoid swelling), after the treatment of the crude vanadyl phthalocyanine with sulfuric acid (e.g. 75 percent) instead of filtering the mixture as such, a dilution with deionized water is performed, under rigorously controlled low temperatures, specifically and preferably between $-20°$ C. to $+5°$ C. Adequate agitation for a proper heat transfer within the thick pigment-acid slurry and to the refrigeration agent in the vessel jacket must be employed. The dilution range can vary between 20 to 50 percent aqueous sulfuric acid, preferably 30 to 45 percent in order to achieve a preferred viscosity volume ratio for an optimum overall filtration time. Moreover, following the separation of the vanadyl phthalocyanine cake by filtration, the wet cake is washed with "cold deionized water", followed by extensive washings with dilute sodium hydroxide aqueous solution, hot deionized water, N,N'-dimethylformamide and again hot deionized water prior to drying to produce a "prepurified" vanadyl phthalocyanine. It has been demonstrated that the temperature of the above described dilution step is very important to obtaining lower dark decay pigments, with practically the same or slightly better photosensitivities. Further, in the final purification step, the quenching of the acid solution in deionized water is performed at a temperature of "0° C.-5° C." as opposed to "8° C.-12° C." in the process described in U.S. Pat. No. 4,557,868 to Page et al. Furthermore after recovering the acid pasted vanadyl phthalocyanine by filtration the wet cake is slurry washed with "cold" deionized water followed by hot washes using deionized water as opposed to prewarmed deionized water and ammonium hydroxide washes.

The expression "dark decay", as employed herein, is defined as the decrease in surface potential in the dark of an electrophotographic photoreceptor device after charging, usually measured in terms of volts per second.

The "photosensitivity" of an electrophotograhic device is commonly expressed by E1/2 values in erg/cm$^2$, which are defined as the amount of expose light energy required to reduce the initial potential of the device by 50 per cent. The smaller the E1/2 value, the higher is the photosensitivity.

Thus, process changes were implemented in both the prepurification (permutoid swelling) and final purification (acid pasting) phases of U.S. Pat. No. 4,557,868 to Page et al. A markedly superior pigment was obtained when the dilution of the 75 percent H$_2$SO$_4$-phthalocyanine mixture was performed at $-5°$ C. to $+4°$ C. with deionized water in the permutoid swelling step and when the pigment washing following the acid pasting step was performed with cold and hot deionized water free of a base such as ammonium hydroxide. The improved xerographic properties were demonstrated in electrophotographic devices incorporating the vanadyl phthalocyanine prepared by the method of this invention.

The invention will now be described in detail with respect to specific preferred embodiments thereof, it being understood that these and control examples are intended to be illustrative only and that the invention is not intended to be limited to the materials, conditions, process parameters and the like recited herein. All parts and percentages are by weight unless otherwise indicated.

EXAMPLE I

Synthesis of "Crude" Vanadyl Phthalocyanine Pigment Phase

A 100 gallon glass lined Pfaudler reactor equipped with a glass lined reflux condenser and jacket was charged with 285 kg ethylene glycol, 9.55 kg vanadium pentoxide and 83.5 kg o-phthalodinitrile. The loading port was closed, cooling was initiated on the condenser and the reactor retreat curve impeller agitator speed was adjusted to 100 rpm. The reactor was heated with steam which was slowly adjusted to a maximum pressure of 675 kPa. When the reactor temperature reached 155° C.–160° C., an exotherm was noticed and the steam valve to the reactor jacket was closed. The reactor temperature reached 192° C.–194° C. with ethylene glycol refluxing in the condenser and then slowly decreased. At a temperature of 165° C.–170° C., the steam was restarted to the reactor jacket. The reaction was continued for a total of 3 hours from the exotherm peak. When the reaction was finished, a coolant was applied to the reactor jacket. After the reactor contents were cooled to 90° C.–95° C., half of the batch was transferred to a 50 gal, Teflon coated stainless steel filter equipped with a pitched blade turbine agitator. Vacuum filtration was started and, as allowed, the remaining batch was transferred from the reactor to the filter. Filtration was carried out under continuous agitation. After most of the filtrate was drained, the wet cake was washed in the filter sequentially with a total of 380 kg N,N'-dimethylformamide, 50 kg isopropanol, 100 kg about 4 percent aqueous NaOH and 750 kg deionized water. All washingsfiltrations were performed at 50° C.–80° C. under continuous agitation. After the final deionized water washing-filtration, the wet cake was discharged to a vacuum shelf drier and dried at 80° C.–90° C. under vacuum until constant weight was achieved. A total of 50.1 kg (82.7 percent based on vanadium pentoxide) "crude" vanadyl phthalocyanine was obtained.

Prepurification Step (Permutoid Swelling) Phase 525 kg 75 percent by weight sulfuric acid was prepared from 420 kg 93 percent by weight $H_2SO_4$ and 105 kg deionized water and ice in a 100 gallon glass lined reactor equipped with a jacket and a retreat curve impeller agitator. The acid was prepared with agitation, while a coolant was supplied to the reactor jacket. 25 kg "crude" vanadyl phthalocyanine pigment was charged in the reactor after which the agitator speed was adjusted to 120 rpm. The $H_2SO_4$-pigment mixture was maintained, with agitation, at a temperature not exceeding $+25°$ C. for 3 hours. After allowing the mixture to digest overnight, a portion of the $H_2SO_4$-pigment mixture was transferred to a 24 inch diameter, 50 gallon, Teflon lined stainless steel filter and the filtration started under continuous agitation. A very slow filtration rate extended the filtration of the acid slurry over several days and finally the filtration had to be stopped and the filter contents discharged. About 70 percent of the original liquid still remained in the filter immediately prior to discharge of the filter contents. The filtration of the 75 percent $H_2SO_4$-vanadyl phthalocyanine pigment could not be performed at this scale within reasonable equipment and time conditions. This Example demonstrates that the procedure practiced according to U.S. Pat. No. 4,557,868 encounters major equipment and time condition difficulties in the scale-up of the filtration step in the prepurification (permutoid swelling) phase.

EXAMPLE II

Prepurification (Permutoid Swelling) Phase 368.5 kg 75 percent by weight sulfuric acid was prepared from 295 kg 93 percent by weight $H_2SO_4$ and 73.5 kg deionized water in a 100 gal glass lined reactor equipped with a jacket and a retreat curve impeller agitator. The acid was prepared with agitation, while a coolant was supplied to the reactor jacket. 17.5 kg of "crude" vanadyl phthalocyanine pigment prepared as described in Example I (Synthesis of "Crude" Vanadyl Phthalocyanine Pigment Phase) was charged in the reactor after which the agitator speed was adjusted to 100 rpm. The $H_2SO_4$-pigment mixture was maintained with agitation at a temperature below $+25°$ C. for 3 hours. After allowing the mixture to digest overnight, about 80 liters of the mixture was transferred to a 24 inch diameter, 50 gallon, teflon coated stainless steel filter equipped with a cooling jacket and a pitched blade turbine agitator. With the agitator operated at 100 rpm and external coolant applied to the filter jacket, the 75 percent concentration $H_2SO_4$-pigment slurry was diluted with 100 kg deionized water. The coolant and the deionized water addition rate was adjusted so as not to exceed a temperature of 25° C. in the filter. After the dilution step in the filter was completed, the vacuum filtration was initiated. The material remaining in the reactor was diluted in the reactor with 150 kg deionized water, with sufficient coolant supplied to the jacket and agitation to maintain the temperature in the reactor below $+25°$ C. As the vacuum filtration was continued, the remaining material from the reactor was transferred to the filter as space became available. After about 15 hours of filtration a significant part of the filtrate was drained and the wet cake was washed in the filter sequentially with a total of about 300 kg cold deionized water at about 25° C., followed by washings at 70° C.-80° C. with 237 kg 4 percent aqueous NaOH, 300 kg deionized water, 232 kg N,N'-dimethylformamide and 500 kg deionized water. All washes were done under continuous agitation with a contact time of up to 1 hour prior to starting the filtration. The wet cake was then discharged in a vacuum shelf drier and dried at 80° C.-90° C. under vacuum until constant weight. A total of 12.92 kg (73.8% yield) of prepurified vanadyl phthalocyanine was obtained.

Final Purification (Acid Pasting) Phase 75 kg concentrated sulfuric acid (minimum 94 percent by weight) was charged in a 30 gallon glass lined reactor equipped with a jacket and a retreat curve impeller agitator and cooled down to 8° C.-10° C. under agitation using a coolant supplied to the reactor jacket. Cooling was terminated after about 10 minutes and 3.5 kg prepurified vanadyl phthalocyanine charged slowly in the reactor during a period of 30 minutes. Sufficient coolant was supplied to the reactor jacket to maintain the reactor temperature below $+12°$ C. The dissolution of vanadyl phthalocyanine in sulfuric acid was continued for a total of 3 hours, at an agitator speed of 75 rpm to maintain the solution temperature under $+12°$ C. During the dissolution step, 220 kg deionized water was charged in a 100 gallon glass lined reactor equipped with a cooling jacket and a retreat curve impeller agitator and cooled, with agitation and circulation of a coolant in the reactor jacket, to 1° C.-3° C. When the dissolution step in the 30 gallon glass lined reactor was completed, the vanadyl phthalocyanine-sulfuric acid solution was quenched slowly in the deionized water in the 100 gallon glass lined reactor. During the quenching/precipitation step the temperature in the 100 gal reactor was maintained at $-2°$ C. to $+3°$ C., by controlling the flow of coolant to the reactor jacket as well as the rate of addition of the acid solution to the deionized water. A high level of agitation, e.g. 100 rpm, was maintained throughout this quenching step. The acid solution addition rate was adjusted for a total addition time of 1¾-2 hours. As soon as the quenching step was completed, most of the material was discharged into a 50 gallon teflon coated, stainless steel agitated filter equipped with an pitched blade turbine agitator and filtration was started under continuous agitation of the pigment-acid slurry. As soon as the level in the filter was low enough, the remaining material from the 100 gallon reactor was transferred to the filter while the filtration process was continuing.

A second dissolution step using 75 kg concentrated sulfuric acid and 3.5 kg prepurified vanadyl phthalocyanine followed by a quenching step was performed as described above. When the second quenching step was completed in the 100 gallon reactor, a portion of the material was transferred to the filter, on top of the first acid pasted pigment wet cake. The vacuum filtration was continued and, as space became available, the remaining quantity of material was discharged from the 100 gallon reactor into the filter. The two combined portions of acid pasted vanadyl phthalocyanine were then washed in the filter, under continuous agitation with a total of 300 kg deionized water at room temperature followed by hot washes, at 50° C.-80° C., with a total of 800 kg deionized water. The wet cake was then divided in two portions.

The first portion was washed with a total of 327.5 kg of about 4 percent ammonium hydroxide at 60° C.-80° C., followed by 70°-80° C. hot deionized water washes.

100 kg deionized water washes were then used and the washing-filtration sequence was continued until the conductivity of the effluent was consistently less than 10 micromhos. The wet cake was discharged in a vacuum shelf drier and dried at 80° C.–90° C. under vacuum until constant weight was achieved. A total of 1.9 kg photoreceptor grade vanadyl phthalocyanine sample (IIa) was obtained.

The second portion of the acid pasted vanadyl phthalocyanine was washed exclusively with hot deionized water until the conductivity of the effluent was consistently less than 10 micromhos. The wet cake was dried as described above and 4.4 kg photoreceptor grade vanadyl phthalocyanine sample (IIb) was obtained.

Example II was illustrates a large scale process practiced in accordance to U.S. Pat. No. 4,557,868, with a modification in the prepurification step (permutoid swelling), namely a dilution of the 75 percent acid-pigment mixture at room temperature, which renders the filtration step feasible as a large scale operation.

By dividing the acid pasted vanadyl phthalocyanine into two portions—one washed with 4 percent ammonium hydroxide, sample (IIa), and the second exclusively with deionized water, sample (IIb), the influence of the two washing procedures on the electrical properties of the pigment will hereinafter be illustrated.

EXAMPLE III

Synthesis of "Crude" Vanadyl Phthalocyanine Phase

The procedure described in Example I, Synthesis of "Crude" Vanadyl Phthalocyanine Pigment Phase, was used to prepare 60.4 kg (99.5 percent yield) "crude" vanadyl phthalocyanine.

Prepurification (Permutoid Swelling) Phase 186 kg 75 percent sulfuric acid from 150 kg 93 percent $H_2SO_4$ and 36 kg deionized water was prepared in a 100 gal. glass lined reactor equipped with a jacket and a retreat curve impeller agitator. The acid was prepared with agitation, while a coolant was circulated in the reactor jacket 17.5 kg "crude" vanadyl phthalocyanine was charged in the reactor and the agitator speed was adjusted to 90 rpm. The $H_2SO_4$-pigment mixture was maintained with agitation at a temperature less than 25° C. for 3 hours. After allowing the mixture to digest overnight, the system was cooled with agitation to 0°–2° C. by circulating a refrigeration fluid (at −20° C. to −25° C.) in the reactor jacket. 150 kg deionized water was added slowly to the reactor under agitation at 100 rpm, while maintaining the temperature at −1° C. to +3° C. When the dilution step was finished, a portion of the material was transferred to a 24 inch diameter 50 gallon, Teflon coated stainless steel vacuum filter equipped with a pitched blade turbine agitator. Vacuum filtration was started and, as space became available, the remainder of the batch was transferred to the filter. The filtration was carried out with continuous agitation. After about 8 hours, a significant amount of the filtrate was drained. The wet cake was washed in the filter, sequentially, with a total of 300 kg cold deionized water, followed by 70°–80° C. washings with 258 kg 4 percent aqueous NaOH, 300 kg deionized water, 220 kg N,N'-dimethyl formamide and 500 kg deionized water. All washings were carried out under continuous agitation with a contact time of up to 1 hour prior to starting the filtration. The wet cake was then discharged to a vacuum shelf drier and dried at 80°–90° C. under vacuum until constant weight. A total of 14.94 kg (85.4 percent yield) of prepurified vanadyl phthalocyanine was obtained.

Final Purification (Acid Pasting) Phase 75 kg concentrated sulfuric acid (minimum 94 Percent by weight) was charged in a 30 gallon glass lined reactor equipped with a jacket and a retreat curve impeller agitator and cooled to 8° C.–10° C. with agitation and circulation of a cooling agent in the reactor jacket. The cooling was thereafter terminated and 3.5 kg prepurified vanadyl phthalocyanine was charged slowly into the reactor during a period of 30 minutes. The cooling was restarted, as required, in order to maintain the reactor temperature below +12° C. The dissolution of vanadyl phthalocyanine in sulfuric acid was continued for a total of 3 hours at an agitator speed of 75 rpm while maintaining the solution temperature below +12° C. During the dissolution step, 220 kg deionized water was charged in a 100 gallon glass lined reactor equipped with a jacket and a retreat curve impeller agitator and cooled, with agitation and circulation of a cooling agent in the reactor jacket, to 1° C.–3° C. When the dissolution step was completed, the vanadyl phthalocyanine-sulfuric acid solution was quenched slowly in the deionized water. During the quenching/precipitation step the temperature in the 100 gal reactor was maintained at 0° C. to +3° C., by controlling the rate of circulation of coolant in the reactor jacket as well as the rate of addition of the acid solution. A high degree of agitation of about 200 rpm was maintained throughout the quenching step. The acid solution addition rate was adjusted for a total addition time of 2 hours. As soon as the quenching step was completed, most of the material in the reactor was discharged into a 70 gallon plastic vacuum filter equipped with a pitched blade turbine agitator and filtration was started with continuous agitation of the pigment-acid slurry. As soon as the level in the filter was sufficiently low, the remaining material from the 100 gallon reactor was transferred to the filter while the filtration process was continuing. A second dissolution step using 75 kg concentrated sulfuric acid and 3.5 kg prepurified vanadyl phthalocyanine followed by a quenching step was performed as described above in this example. When the second quenching step was completed in the 100 gallon reactor, a portion of the material was transferred to the filter, on top of the first acid pasted pigment wet cake. The vacuum filtration was continued and, as space became available, the entire quantity of material was discharged into the filter. The two combined portions of acid pasted vanadyl phthalocyanine were then washed in the filter, under continuous agitation with a total of 300 kg deionized water at room temperature. The washing-filtration process was continued using 70° C.–85° C. deionized water. 100 kg preheated deionized water was used for each washing step, with a contact time of approximately 15 minutes prior to application of the vacuum to drain the wash.

The conductivity of the effluent wash was monitored. The washings were considered completed when the conductivity of the effluent was consistently under 10 micromhos. A minimum of 15 hot deionized washes was applied. After the final washing-filtration steps, the wet cake was discharged to a vacuum shelf dryer and dried at 80° C.–90° C. under vacuum until constant weight was achieved. A total of 6.56 kg (93.7 percent yield)

photoreceptor grade vanadyl phthalocyanine described as sample (III) was obtained.

This Example, Example III, illustrates an improved process practiced in accordance with this invention.

EXAMPLE IV

Electrophotographic photoreceptor devices were prepared to test the following examples:

I. Vanadyl phthalocyanine pigment obtained according to U.S. Pat. No. 4,557,868 (Example III, table, sample no. 7, I.D. No. 15558103) was used as a "control" material.

IIa. Vanadyl phthalocyanine pigment sample IIa (with ammonium hydroxide wash in the acid pasting step) obtained as per Example II.

IIb. Vanadyl phthalocyanine pigment sample IIb (exclusively deionized water washes in the acid pasting step) obtained as per Example II.

III. Vanadyl phthalocyanine obtained as per Example III (low temperature dilution in the permutoid swelling and washes exclusively with deionized water in the acid pasting step) in accordance with the procedures of the present invention.

The vanadyl phthalocyanine samples were tested in photoreceptor devices obtained by coating a charge generator layer and a charge transport layer on a standard photoreceptor substrate web substrate. The standard photoreceptor substrate included a conductive substrate (aluminized polyethylene terephthalate), a charge blocking layer (silane reaction product) and polyester adhesive layer (DuPont 49,000, available from E.I. du Pont de Nemours Co.). The charge generator layer had a thickness of 0.4–0.6 micrometer and contained 30 percent by weight of vanadyl phthalocyanine in a polyester resin binder (Vitel PE-200, available from Goodyear Tire & Rubber Co.). The charge transport layer had a thickness of 15–17 micrometers and contained 35 percent by weight N,N'-diphenyl-N,N'-bis-(3-methylphenyl)-1,1'-biphenyl-4,4'-diamine in polycarbonate resin (Merlon 39, available from Mobay Chemical Co.). The vanadyl phthalocyanine dispersion was prepared by ball milling 30 percent by weight vanadyl phthalocyanine pigment and 70 percent by weight polyester resin in $CH_2Cl_2$ for 6 hours. The solid content of the dispersion was 4 percent by weight. The dispersion was coated onto the standard substrate using a 1 mil applicator, available from Gardner Lab. Inc. The resulting coating was dried at 135° C. for 20 minutes. The charge transport solution was obtained by dissolving 35 percent by weight N,N'-diphenyl-N,N'-bis-(3-methylphenyl)-1,1'-biphenyl-4,4'-diamine and 65 percent by weight polycarbonate resin in $CH_2Cl_2$ at a total solids content level of 7 percent by weight. The coating of the transport layer was performed using a 10 mil applicator, available from Gardner Lab Inc. The device was dried at 135° C. for 20 minutes. The testing of this negative charging device was performed using a computer controlled flat plate scanner with a 150W Xenon lamp light source, at a wavelength of 830 nm. Constant voltage charging ($V_{ddp} \sim -830$ volts) was used to deposit a uniform negative charge on the imaging surface of the device. The pigments were also tested for sulfur content and weight loss to 400° C. (TGA). The electrical evaluation results for the devices prepared with the above described vanadyl phthalocyanine samples are presented in the Table below:

| SAMPLE | ELECTRICAL EVALUATION | | PIGMENT CHARACTERIZATION | |
|---|---|---|---|---|
| | Dark Decay V/s | $E_{\frac{1}{2}}$ erg/cm$^2$ | Sulfur PPM | TGA % Loss |
| I | 37 | 4.2 | 215 | 0.3 |
| IIa | 39 | 4.8 | 86 | 0.29 |
| IIb | 31 | 4.3 | 73 | 0.54 |
| I | 40 | 4.2 | 215 | 0.3 |
| III | 25 | 3.8 | 67 | 0.25 |

Whenever a device of this invention was freshly fabricated and tested at a significantly different point in time than previously prepared devices, Sample 1 in the above Table ws retested as a control along with the freshly fabricated device of this invention. The results presented in the Table show the effect of the above modifications on the electrical properties and purity of the pigment. Generally a low sulfur content and a low TGA % loss of the pigment are an indication of lower dark decays. The combination of lower dark decay and high photosensitivity of the vanadyl phthalocyanine produced according to this invention are evident in the results obtained.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for preparing vanadyl phthalocyanine for electrophotographic devices comprising a
   (a) crude vanadyl phthalocyanine pigment synthesis phase comprising reacting vanadium pentoxide and phthalonitrile to form vanadyl phthalocyanine pigment and other reaction products, separating crude vanadyl phthalocyanine pigment from said other reaction products, drying said crude vanadyl phthalocyanine pigment;
   (b) a dried, partially purified vanadyl phthalocyanine pigment preparation, permutoid swelling phase comprising mixing said crude vanadyl phthalocyanine pigment with between about 60 percent and about 80 percent by weight solution of $H_2SO_4$ to form an $H_2SO_4$-vanadyl phthalocyanine pigment mixture, diluting with agitation said $H_2SO_4$-vanadyl phthalocyanine pigment mixture with deionized water while maintaining the dilution temperature between about −20° C. and about +5° C. to form a diluted mixture, separating the vanadyl phthalocyanine pigment by filtration, washing the isolated vanadyl phthalocyanine pigment particles, and drying said vanadyl phthalocyanine pigment to form said dried, partially purified vanadyl phthalocyanine pigment; and
   (c) a purified vanadyl phthalocyanine pigment preparation, acid pasting phase comprising dissolving said dried, partially purified vanadyl phthalocyanine pigment in at least 94 percent concentrated $H_2SO_4$ to form a solution of vanadyl phthalocyanine in concentrated $H_2SO_4$, adding said solution of vanadyl phthalocyanine in concentrated $H_2SO_4$ to water while maintaining said solution at a temperature of between about 0° C. and about 5° C. to precipitate said vanadyl phthalocyanine as vanadyl phthalocyanine pigment particles, separating the precipitated vanadyl phthalocyanine pigment particles from said $H_2SO_4$ and water to isolate said vanadyl phthalocyanine pigment particles, washing said vanadyl phthalocyanine pigment particles with water free of any base, and drying said vanadyl phthalocyanine pigment particles to form said purified vanadyl phthalocyanine pigment.

2. A process for preparing vanadyl phthalocyanine for electrophotographic devices according to claim 1 including, in said permutoid swelling phase, diluting with deionized water said $H_2SO_4$-vanadyl phthalocyanine pigment mixture while maintaining the temperature of said $H_2SO_4$-vanadyl phthalocyanine pigment mixture between about $-20°$ C. and about $+5°$ C. with continuous cooling and agitation to form said partially purified vanadyl phthalocyanine pigment prior to any filtration and washing steps, separating said partially purified vanadyl phthalocyanine pigment from said other reaction products, and washing said pigment cake with solvents prior to drying said pigment cake of partially purified vanadyl phthalocyanine pigment.

3. A process for preparing vanadyl phthalocyanine for electrophotographic devices according to claim 2 including, in said permutoid swelling phase, diluting with said deionized water said $H_2SO_4$-vanadyl phthalocyanine pigment mixture to a dilution of between about 20 percent and about 50 percent by weight aqueous $H_2SO_4$ while maintaining the dilution temperature between about $-20°$ C. and about $+5°$ C.

4. A process for preparing vanadyl phthalocyanine for electrophotograhic devices according to claim 3 including, in said permutoid swelling phase, diluting with said deionized water said $H_2SO_4$-vanadyl phthalocyanine pigment mixture to a dilution of between about 30 percent and about 45 percent by weight aqueous $H_2SO_4$ while maintaining the dilution temperature between about $-5°$ C. and about $+4°$ C.

5. A process for preparing vanadyl phthalocyanine for electrophotographic devices according to claim 1 wherein the washing agent for said washing of said vanadyl phthalocyanine pigment particles during said acid pasting phase is deionized water.

6. A process for preparing vanadyl phthalocyanine for electrophotographic devices according to claim 2 including washing the vanadyl phthalocyanine pigment particles isolated during said acid pasting phase with deionized water free of ammonium hydroxide, and drying said pigment particles.

7. A process for preparing vanadyl phthalocyanine for electrophotographic devices according to claim 5 wherein, in said permutoid swelling phase, said mixing of said crude vanadyl phthalocyanine pigment with said $H_2SO_4$ to form said $H_2SO_4$-vanadyl phthalocyanine pigment mixture is performed at a temperature between about 0° C. and about 25° C. and said diluting of said $H_2SO_4$-vanadyl phthalocyanine pigment mixture with said deionized water to form vanadyl phthalocyanine pigment is carried out while maintaining the dilution temperature between about $-5°$ C. and about $+4°$ C.

8. A process for preparing vanadyl phthalocyanine for electrophotographic devices according to claim 5 including, in said acid pasting phase, slurry washing said vanadyl phthalocyanine pigment particles separated from said $H_2SO_4$ and water by filtration with cold deionized water at least once followed by washing said vanadyl phthalocyanine pigment particles with hot deionized water, prior to drying said pigment particles.

9. A process for preparing vanadyl phthalocyanine for electrophotographic devices according to claim 6 including, in said acid pasting phase, slurry washing said vanadyl phthalocyanine pigment particles separated from said $H_2SO_4$ and water by filtration with cold deionized water and washing said vanadyl phthalocyanine pigment particles with hot deionized water.

10. A process for preparing vanadyl phthalocyanine for electrophotographic devices according to claim 6 wherein, in said permutoid swelling phase, said mixing of said crude vanadyl phthalocyanine pigment with said $H_2SO_4$ to form said $H_2SO_4$-vanadyl phthalocyanine pigment mixture is performed at a temperature between about 0° C. and about 25° C. and said diluting of said $H_2SO_4$-vanadyl phthalocyanine pigment mixture with said deionized water to form vanadyl phthalocyanine pigment is carried out while maintaining the dilution temperature between about $-5°$ C. and about $+4°$ C.

11. A process for preparing vanadyl phthalocyanine for electrophotographic devices according to claim 1 including, in said acid pasting phase, adding said solution of vanadyl phthalocyanine in said concentrated $H_2SO_4$ to deionized water in order to precipitate said vanadyl phthalocyanine as vanadyl phthalocyanine pigment particles while maintaining said solution at a temperature of between about 0° C. and about $+5°$ C.

12. A process for preparing vanadyl phthalocyanine for electrophotographic devices comprising a
(a) crude vanadyl phthalocyanine pigment synthesis phase comprising reacting vanadium pentoxide and phthalonitrile to form vanadyl phthalocyanine pigment and other reaction products, separating crude vanadyl phthalocyanine pigment from said other reaction products, drying said crude vanadyl phthalocyanine pigment;
(b) a dried, partially purified vanadyl phthalocyanine pigment preparation, permutoid swelling phase comprising mixing said crude vanadyl phthalocyanine pigment with an about 60 percent to about 80 percent by weight solution of $H_2SO_4$ at a temperature between about 0° C. and about 25° C. to form an $H_2SO_4$-vanadyl phthalocyanine pigment mixture, diluting with agitation said $H_2SO_4$-vanadyl phthalocyanine pigment mixture with deionized water to a dilution of between about 20 percent and about 50 percent by weight aqueous $H_2SO_4$ while maintaining the dilution temperature between about $-20°$ C. and about $+5°$ C. to form form the vanadyl phthalocyanine pigment prior to any filtration and washing steps, separating the vanadyl phthalocyanine pigment by filtration, washing the isolated vanadyl phthalocyanine pigment particles, drying said vanadyl phthalocyanine particles to form said dried, partially purified vanadyl phthalocyanine pigment; and
(c) a purified vanadyl phthalocyanine pigment preparation acid pasting phase comprising dissolving said dried, partially purified vanadyl phthalocyanine pigment in at least 94 percent by weight concentrated $H_2SO_4$ to form a solution of vanadyl phthalocyanine in concentrated $H_2SO_4$, adding said solution of vanadyl phthalocyanine in concentrated $H_2SO_4$ to deionized water while maintaining said solution at a temperature of between about 0° C. and about $+5°$ C. to precipitate said vanadyl phthalocyanine as vanadyl phthalocyanine pigment particles, separating the precipitated vanadyl phthalocyanine pigment particles from said $H_2SO_4$ and water to isolate said vanadyl phthalocyanine pigment particles, slurry washing said vanadyl phthalocyanine pigment particles with deionized water at about room temperature at least once, washing said vanadyl phthalocyanine pigment particles with deionized water free of any base at about room temperature, washing said vanadyl phthalocyanine pigment particles with water free of any base and at a temperature of between about 70° C. and about 85° C. until the wash effluent has a conductivity of less than about 10 micromhos, and drying said vanadyl phthalocyanine pigment particles to form said purified vanadyl phthalocyanine pigment.

* * * * *